Nov. 24, 1964

G. H. FARNSWORTH 3,158,789

CIRCUIT PROTECTOR

Filed April 19, 1962

INVENTOR.
GEORGE H. FARNSWORTH
BY
OSTROLENK, FABER, GERB & SOFFEN
ATTORNEYS

Nov. 24, 1964
G. H. FARNSWORTH
3,158,789
CIRCUIT PROTECTOR
Filed April 19, 1962
4 Sheets-Sheet 2
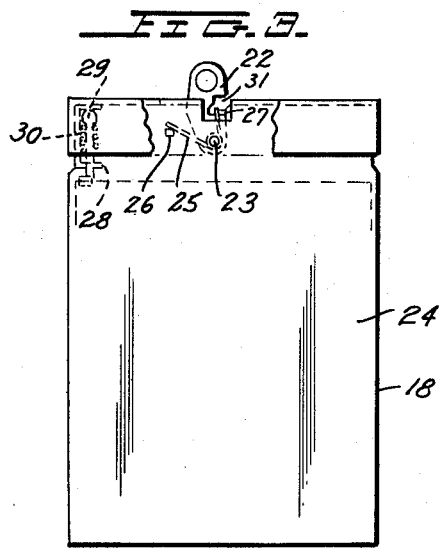
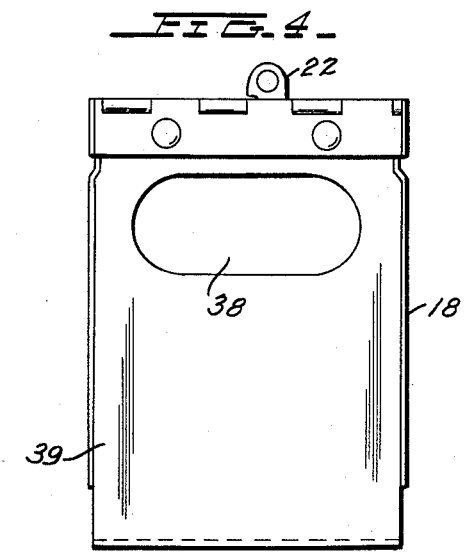
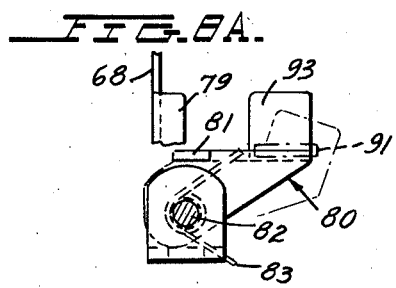
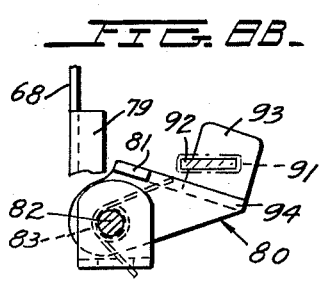
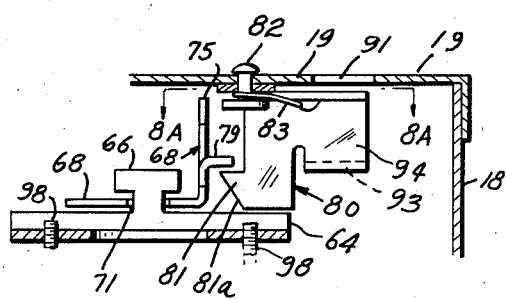
INVENTOR.
GEORGE H. FARNSWORTH
BY
OSTROLENK, FABER, GERB & SOFFEN
ATTORNEYS

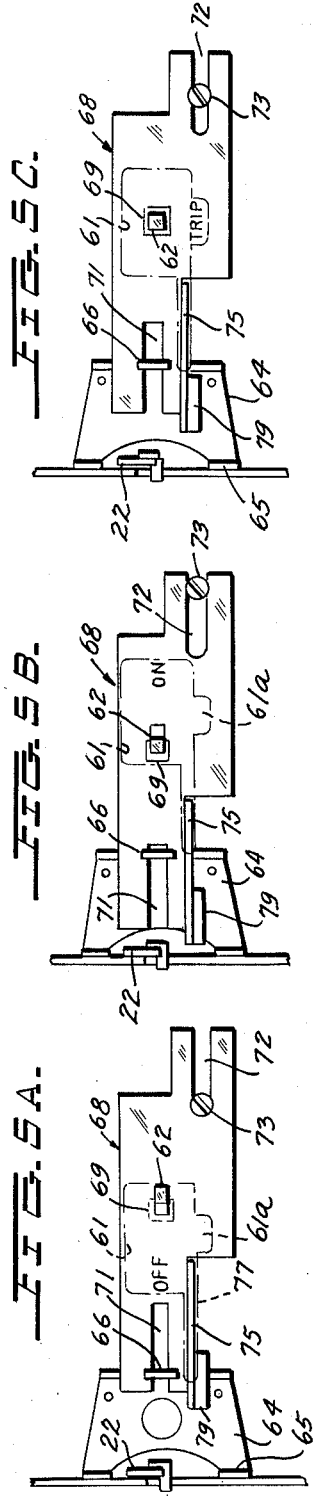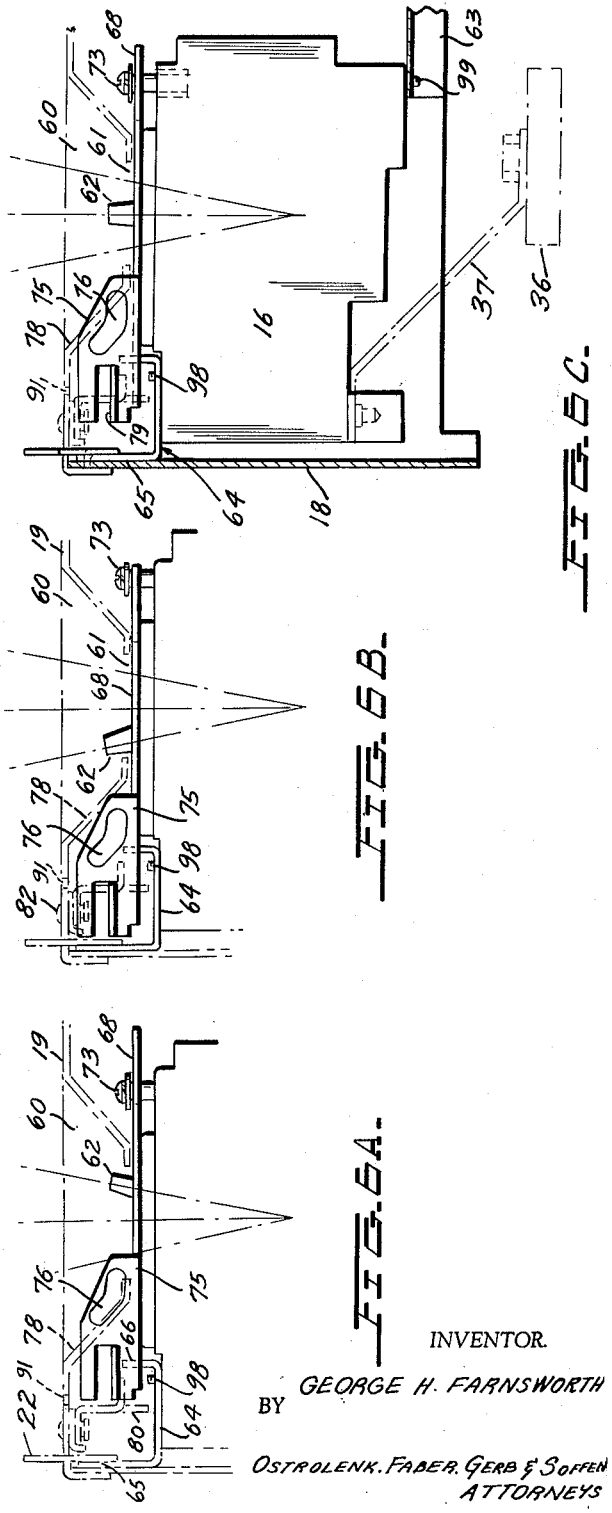

Nov. 24, 1964　　　G. H. FARNSWORTH　　　3,158,789
CIRCUIT PROTECTOR

Filed April 19, 1962　　　　　　　　　　　　　　4 Sheets-Sheet 4

INVENTOR.
GEORGE H. FARNSWORTH
BY
OSTROLENK, FABER, GERB & SOFFEN
ATTORNEYS

3,158,789
CIRCUIT PROTECTOR
George H. Farnsworth, Grosse Pointe Woods, Mich., assignor to I-T-E Circuit Breaker Company, Philadelphia, Pa., a corporation of Pennsylvania
Filed Apr. 19, 1962, Ser. No. 188,662
6 Claims. (Cl. 317—119)

This invention relates to circuit protectors of the type mounted to a panelboard and more particularly to a device of this type having a novel enclosure structure.

Because of certain electrical code requirements control apparatus for various electrical devices are seldom used alone but are instead used in combination with circuit protective devices. The instant invention relates to such a combination unit for a panelboard with the unit including a circuit breaker and control apparatus housed within the same enclosure. In this case the control apparatus is a motor starter.

The starter functions to both control and protect the motor and the circuit breaker serves to protect the wiring and starter against fault currents including shorts and grounds. In this connection the starter functions to disconnect the motor in the event of low overload currents and the circuit breaker serves to disconnect the starter and motor in the event of high overload currents including short circuits.

The combination enclosure of the instant invention which houses both the circuit breaker and starter is provided with a cover having an embossed depression so that the handle of the breaker positioned within the enclosure is accessible with the cover closed yet is positioned below the main surface of the cover so as to prevent breakage of the handle. Novel latch means are provided for maintaining the cover in closed position when the circuit breaker is On. Additional means are provided to enable the latch means to be defeated so that under extraordinary circumstances the cover may be opened even if the circuit breaker is On.

In the device of the instant invention a slider plate is secured to the circuit breaker operating handle. This plate includes an abutment portion which cooperates with a cover carried latch to form the cover interlock. Another portion of the slider plate extends externally of the enclosure and is provided with an aperture to receive the hasp of a lock when the circuit breaker is Off. The lock is thereby positioned to cooperate with the cover to prevent operation of the circuit breaker to On position.

Accordingly a primary object of this invention is to provide a novel structure for protective equipment mounted to a panelboard.

Another object is to provide a novel enclosure for circuit protection equipment.

Still another object is to provide a device of this type having novel means for locking the circuit protective device against operation.

A further object is to provide a device of this type having novel means for interlocking the cover in closed position when the circuit breaker is On.

A still further object is to provide a device of this type wherein the circuit breaker handle is accessible with the enclosure cover closed yet is positioned so as to substantially eliminate the possibility of damage to the handle.

Yet another object is to provide a voidable interlock device which permits a qualified operator to open the cover even though the circuit breaker is On.

These as well as other objects of this invention shall become relatively apparent after reading the following description of the accompanying drawings in which FIGURE 1 is a plan view of the combination unit with the enclosure cover rotated 90° with respect to its closed position.

FIGURE 2 is a plan view of the combination unit with the circuit breaker handle in the Off position.

FIGURES 3 and 4 are the end views of the combination unit housing looking in the direction of arrows 3—3 and 4—4 respectively of FIGURE 2.

FIGURES 5A–5C are plan views showing the slider plate in its various operating positions. In FIGURE 5A the circuit breaker handle is in Off position. In FIGURE 5B the circuit breaker handle is in On position and in FIGURE 5C the circuit breaker handle is in Trip position.

FIGURES 6A–6C are side elevations showing the slider plate in the positions of FIGURES 5A–5C, respectively.

FIGURE 7 is a fragmentary cross section taken through line 7—7 of FIGURE 1 looking in the direction of arrows 7—7.

In FIGURE 8A the cover interlock is shown in normal position and in FIGURE 8B it is shown defeated.

Figures 1, 8:
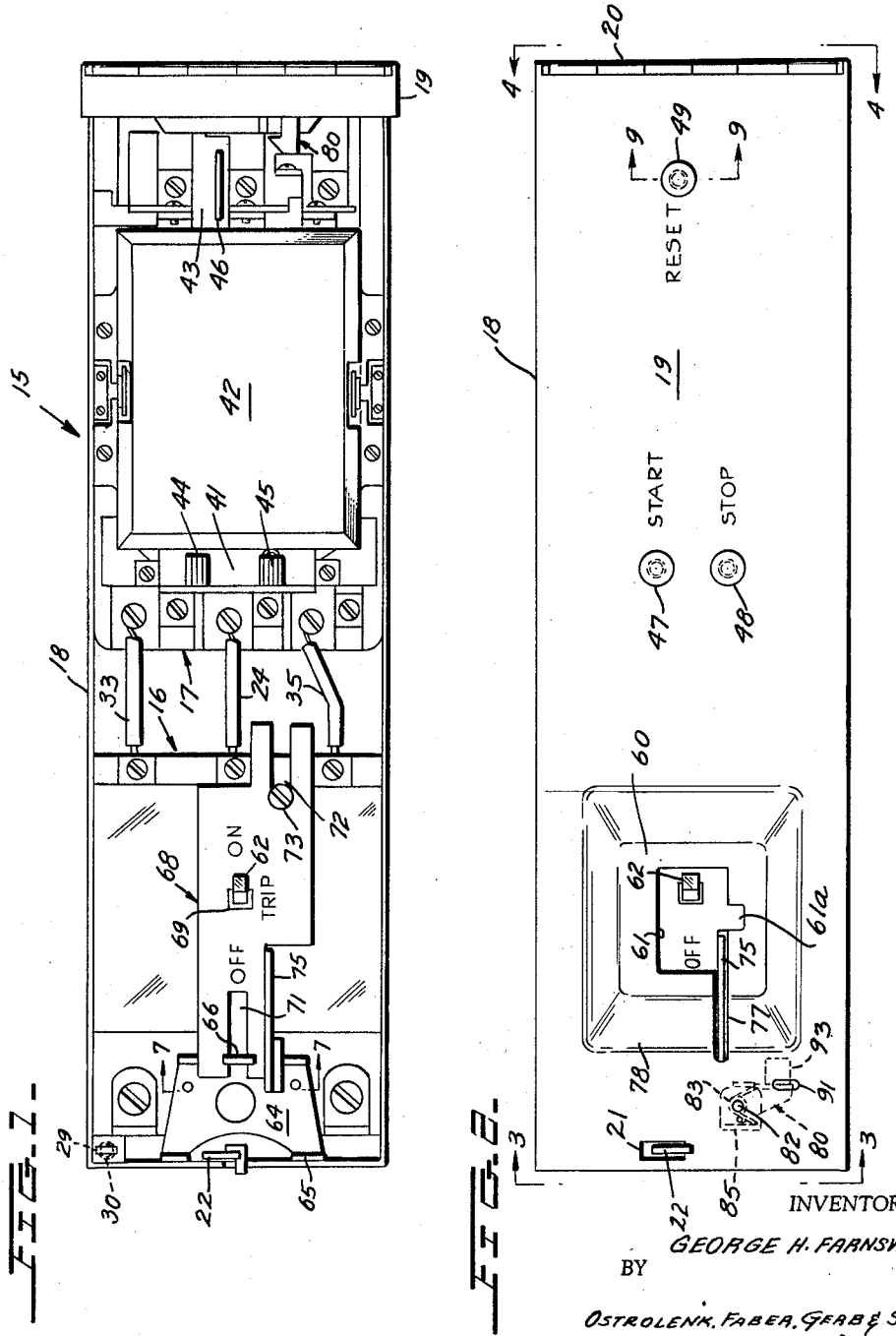
FIGURES 8A and 8B are cross sections taken through line 8—8 of FIGURE 7 looking in the direction of arrows 8—8.

Now referring to the figures, combination unit 15 comprises molded case circuit breaker 16 and motor starter 17 mounted within combination enclosure 18 having openable cover 19. Hinge means 20 at one end of cover 19 pivotally connect cover 19 to enclosure 18. The end of cover 19 remote from hinge means 20 is provided with slot 21 which receives cover catch 22. Catch 22 is mounted to pin 23 at the upper edge of enclosure wall 24. Torsion spring 25 mounted to pin 23 exerts force against wall projection 26 and catch projection 27 to bias catch 22 clockwise with respect to FIGURE 3 to maintain cover 19 in closed position.

U shape bracket 28 secured internally of enclosure 18 mounts plunger 29 and spring 30. When catch 22 is moved counterclockwise with respect to FIGURE 3 to cover release position, spring 30 is free to move plunger 29 upward with respect to FIGURE 3 so that upon subsequent release of catch 22 cover 19 will not reenter catch depression 31. Thus, opening of cover 19 is a one hand operation. The action of plunger 29 and spring 30 prevents chattering even if there is a loose fit between catch 22 and cover 19.

The load terminals of circuit breaker 16 are connected to the line terminals of motor starter 17 by means of insulation covered conductors 33–35. Connection of the circuit breaker line terminals (FIGURE 6C) to the panelboard bus bars 36 may be accomplished by means of offset jumper straps 37 in a manner well known to the art. Control power conductors (not shown) for starter 17 as well as load conductors (not shown) for starter 17 will extend through aperture 38 in end wall 39 of enclosure 18.

Figure 9:
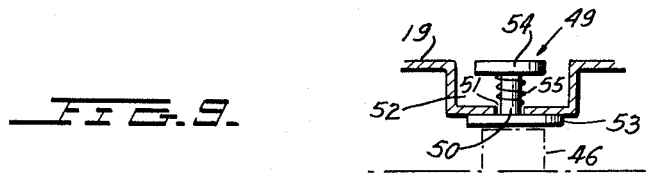
FIGURE 9 is a fragmentary cross section taken through line 9—9 of FIGURE 2 looking in the direction of arrows 9—9.

As is well known to the art, starter 17 includes control device 41, contactor 42, and overload device 43. Control device 41 is provided with depressible Start and Stop plungers 44, 45 respectively while overload device 43 is provided with depressible Reset plunger 46. Mounted to cover 19 are three control assemblies 47–49 of identical construction. Control assembly 49, illustrated in detail in FIGURE 9, comprises shaft 50 extending through aperture 51 in the bottom of cover depression 52. Disk 53 is mounted at one end to shaft 50 on the inside of cover 19 while disk 54 is mounted to the other end of shaft 50 so as to be accessible for operation from the outside of cover 19. Compression spring 55, mounted upon shaft 50, is interposed between the bottom of depression 52 and disk 54 thereby biasing shaft 50 axially in an upward direction with respect to FIGURE 9. The disks 53 of the respective switches 47–49 are positioned in alignment with plungers 44–46, respectively, for operation of these plungers without the necessity of opening cover 19.

A portion of cover 19 remote from hinge means 20 is provided with an embossment defining depression 60 having aperture 61 in the bottom wall thereof. Manual operating handle 62 of circuit breaker 16 projects through aperture 61 with the dimensions of aperture 61 being sufficient to permit operation of handle 62 between its On and Off positions.

Appropriate screw means 99 secure the load end of circuit breaker 16 to ledge 63 at the bottom of enclosure 18. Other screw means 98 secure the line end of circuit breaker 16 to support bracket 64. Leg 65 at one end of bracket 64 is secured to the internal surface of enclosure wall 24 near the upper end thereof. The other end of bracket 64 is provided with T-shaped guide 66 for a purpose to be hereinafter explained.

Interposed between the top surface of circuit breaker 16 and cover aperture 61 is slider plate 68 with operating handle 62 extending through aperture 69 of plate 68. Aperture 69 and handle 62 are so proportioned that movement of handle 62 causes movement of plate 68. Plate 68 is provided with slots 71, 72 which extend parallel to the plane of movement of handle 62. Disposed within slot 71 is the necked down portion of T-shaped guide 66 and disposed within slot 72 is the body portion of screw 73 which extends into the top of the circuit breaker housing. Thus, movement of slider plate 68 is guided by element 66 and 73 in cooperation with slots 71 and 72, respectively.

Slider plate 68 includes upwardly extending tang 75 having locking aperture 76. Tang 75 moves within cover slot 77 which communicates with cover aperture 61. With circuit breaker handle 62 in the Off position of FIGURE 6A, aperture 76 is positioned within cover depression 60 so that a lock hasp may be inserted into aperture 76. With a lock so positioned, depression wall 78 blocks movement of slider plate 68 to the left with respect to FIGURES 5A and 6A thereby preventing operation of circuit breaker handle 62 to the On position. This is essential when work is being performed upon the motors controlled by combination unit 15.

Extending from tang 75 in a direction parallel to the main portion of slider plate 68 is latching abutment 79. Abutment 79 cooperates with hook 81 of interlock member 80 to maintain cover 19 in closed position when circuit breaker 16 is On. Rivet 82 pivotally mounts interlock member 80 to cover 19. Torsion spring 83 biases member 80 in a counterclockwise direction, with respect to FIGURE 2, to its normal or latching position in abutment with bracket wall 85 also secured to cover 19. With circuit breaker handle 62 in the Off position, latching abutment 79 is positioned sufficiently to the right with respect to FIGURE 2 that it will not be engaged by hook 81 upon opening of cover 19.

In order to defeat interlock 80, cover 19 is provided with aperture 91 which is of sufficient size to permit the entry of a screwdriver or similar instrument. Instrument 92 may be entered through aperture 91 far enough to engage blocking portion 93 of interlock member 80 so that instrument 92 cannot contact any live portion of the equipment. With instrument 92 in abutment with blocking portion 93, the tip of instrument 92 may be moved toward the left with respect to FIGURE 2 thereby engaging portion 94 of interlock 80 and pivoting interlock 80 clockwise with respect to FIGURE 8A to the defeated position of FIGURE 8B wherein hook portion 81 is clear of latching abutment 79 of slider plate 68. This permits cover 19 to be opened even though circuit breaker 16 is On. If cover 19 is moved to closed position while the circuit breaker handle 62 is in On position cam surface 81a of interlock 80 will engage latching abutment 79 and interlock 80 will be moved clockwise with respect to FIGURE 8A until hook 81 passes below abutment. Thereafter, spring 83 returns interlock 80 to latching position.

It is noted that slider plate 68 carries indicia indicating On, Off and Trip positions of circuit breaker handle 62. Thus, as clearly seen in FIGURES 5A–5C, with circuit breaker handle 62 in its right-most or Off position only the Off indicia of slider plate 62 is viewable through cover aperture 61. In the left-most or On position of circuit breaker handle 62 only the On indicia of slider plate 68 is viewable through cover aperture 61 and in the center or Trip position of circuit breaker handle 62 only the Trip indicia of slider plate 62 is viewable through notch extension 61a of cover aperture 61.

Figure 11:
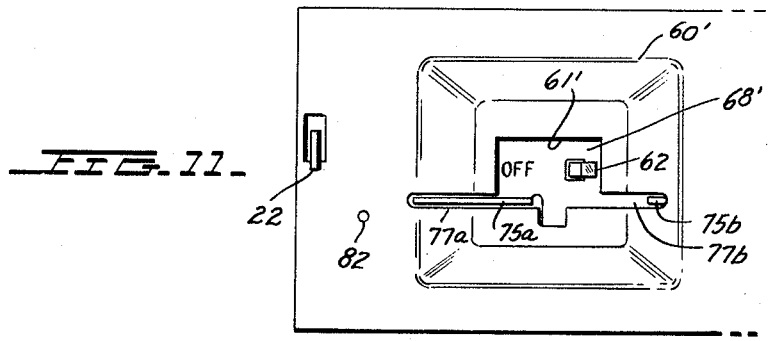
FIGURE 11 is a fragmentary plan view of a combination unit having the modified slider plate of FIGURE 10.
Figure 10:
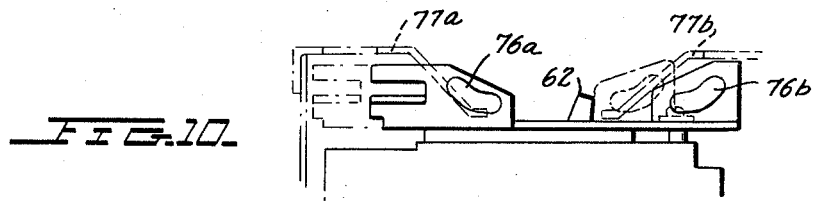
FIGURE 10 is a side elevation of a modified construction for the slider plate.

FIGURES 10 and 11 illustrate another embodiment in this invention in which there is a slider plate 68' having two tangs 75a and 75b. Tangs 75a, 75b are movable through cover slots 77a and 77b, respectively, which communicate with aperture 61' in the bottom wall of cover depression 60'. Each of the tangs 75a and 75b is provided with a lock receiving aperture 76a, 76b respectively. In all other respects slider plates 68 and 68' are identical in construction and in mode of mounting.

With circuit breaker handle 62 positioned in its right-most or Off position of FIGURE 11 and a lock hasp inserted through aperture 76a the left-most wall defining cover depression 60' will block movement of circuit breaker handle 62 to the On position. Similarly with circuit breaker handle 62 in its left-most or On position tang aperture 76b is positioned to receive the hasp of a lock. When a lock hasp is entered through aperture 76b the right-most wall defining cover depression 60' will block movement of circuit breaker handle 62 to the Off position. This is often desirable in order to insure that unauthorized or unknowing persons will not de-energize a circuit whose continuous operation is vital.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A unit of the class described comprising an enclosure having an openable cover, a circuit breaker including a case mounted within said enclosure, a depression in said cover having an aperture at the bottom thereof, said circuit breaker including an operating handle extending from said case through said aperture into said depression so as to be operable within the confines of said depression when said cover is in a closed position, a slider plate within said enclosure interposed between said case and said cover, said plate connected to said handle for movement in unison therewith, said plate constructed to cover said aperture for all positions of said handle, said slider plate including a locking tang movable through a slot-like extension portion of said aperture, said tang having a lock receiving opening which is accessible with said cover closed only when said handle is in an Off position, portions of said cover defining said depression operatively positioned to cooperate with a lock received by said opening to prevent operation of said handle to an On position.

2. A unit of the class described comprising an enclosure having an openable cover, a circuit breaker including a case mounted within said enclosure, a depression in said cover having an aperture at the bottom thereof, said circuit breaker including an operating handle extending from said case through said aperture into said depression so as to be operable within the confines of said depression when said cover is in a closed position, a slider plate within said enclosure interposed between said case and said cover, said plate connected to said handle for movement in unison therewith, said plate constructed to cover said aperture for all positions of said handle, said slider plate including a first and a second locking tang movable through slot-like extension portions of said aperture, said first tang having a first opening which is accessible with said cover closed only when said handle is in an Off position, portions of said cover defining said depression positioned to cooperate with a lock received by said first opening to prevent operation of said handle to an On position, said second tang having a second opening which is accessible with said cover closed only when said handle is in said On position, other portions of said cover defining said depression positioned to cooperate with a lock received by said second opening to prevent operation of said handle to said Off position.

3. A unit of the class described comprising an enclosure having an openable cover, a circuit breaker including a case mounted within said enclosure, a depression in said cover having an aperture at the bottom thereof, said circuit breaker including an operating handle extending from said case through said aperture into said depression so as to be operable within the confines of said depression when said cover is in a closed position, a slider plate within said enclosure interposed between said case and said cover, said plate connected to said handle for movement in unison therewith, said plate constructed to cover said aperture for all positions of said handle, said slider plate including a locking tang movable through a slot-like extension portion of said aperture, said tang having a lock receiving opening which is accessible with said cover closed only when said handle is in an Off position, portions of said cover defining said depression operatively positioned to cooperate with a lock received by said opening to prevent operation of said handle to an On position, said slider plate carrying indicia indicative of handle position with only portions of said indicia corresponding to actual handle position being viewable through said aperture at any given time.

4. A unit of the class described comprising an enclosure having an openable cover, a circuit breaker including a case mounted within said enclosure, a depression in said cover having an aperture at the bottom thereof, said circuit breaker including an operating handle extending from said case through said aperture into said depression so as to be operable within the confines of said depression when said cover is in a closed position, a slider plate within said enclosure interposed between said case and said cover, said plate connected to said handle for movement in unison therewith, said plate constructed to cover said aperture for all positions of said handle, said slider plate including a locking tang movable through a slot-like extension portion of said aperture, said tang having a lock receiving opening which is accessible with said cover closed only when said handle is in an Off position, portions of said cover defining said depression operatively positioned to cooperate with a lock received by said opening to prevent operation of said handle to an On position, said slider plate also including an abutment, an interlock member carried by said cover and having a portion engageable with said abutment when said handle is in said On position thereby normally preventing opening of said cover when said handle is in said On position.

5. A unit of the class described comprising an enclosure having an openable cover, a circuit breaker including a case mounted within said enclosure, a depression in said cover having an aperture at the bottom thereof, said circuit breaker including an operating handle extending from said case through said aperture into said depression so as to be operable within the confines of said depression when said cover is in a closed position, a slider plate within said enclosure interposed between said case and said cover, said plate connected to said handle for movement in unison therewith, said plate constructed to cover said aperture for all positions of said handle, said slider plate including a locking tang movable through a slot-like extension portion of said aperture, said tang having a lock receiving opening which is accessible with said cover closed only when said handle is in an Off position, portions of said cover defining said depression operatively positioned to cooperate with a lock received by said opening to prevent operation of said handle to an On position, said slider plate also including an abutment, an interlock member carried by said cover and having a portion engageable with said abutment when said handle is in said On position wherein there is a cover opening through which a tool is insertable to operate said interlock member to a defeated position wherein said abutment is clear of said interlock member for all positions of said handle, said interlock member including another portion positioned to block movement of a tool entered through said cover opening so that this tool will not contact live elements within said enclosure.

6. A unit of the class described comprising an enclosure having an openable cover, a circuit breaker including a case mounted within said enclosure, an aperture in said cover, said circuit breaker including an operating handle extending through said aperture so as to be operable externally of said cover, a control device mounted within said enclosure, said control device having a plurality of control elements, a plurality of controls carried by said cover, each of said controls operatively positioned for operation of an individual one of said control elements, said cover including a depression, said aperture being in the bottom of said depression and said handle extending into said depression so as to be operable within the confines of said depression when said cover is in closed position, a slider plate within said enclosure interposed between said case and said cover, said plate connected to said handle for movement in unison therewith, said plate constructed to cover said aperture for all positions of said handle wherein the handle is operable between a first and a second position, said plate including a locking tang movable through a slot-like extension portion of said aperture, said tang having a lock receiving opening which is accessible with said cover closed only when said handle is in said first position, portions of said cover defining said depression operatively positioned to cooperate with a lock received by said opening to prevent operation of said handle to said second position, said slider plate carrying indicia indicative of handle position with only portions of said indicia corresponding to actual handle position being viewable through said aperture at any given time.

References Cited in the file of this patent
UNITED STATES PATENTS 2,183,872    Rowe  ------------------ Dec. 19, 1936
2,979,581    Ballou  ----------------- Apr. 11, 1961